S. B. GRAY, DEC'D.
B. S. GRAY, EXECUTOR.
MOTOR VEHICLE.
APPLICATION FILED FEB. 19, 1908.

1,012,842.

Patented Dec. 26, 1911.
5 SHEETS—SHEET 4.

Witnesses:
Frank Bemm.
Wm. P. Bond

Inventor:
Stephen B. Gray
by Fred Gerlach
Atty.

UNITED STATES PATENT OFFICE.

STEPHEN B. GRAY, OF JACKSONVILLE, ILLINOIS; BARTLETT S. GRAY EXECUTOR OF SAID STEPHEN B. GRAY, DECEASED.

MOTOR-VEHICLE.

1,012,842.  Specification of Letters Patent.  Patented Dec. 26, 1911.

Application filed February 19, 1908. Serial No. 416,641.

*To all whom it may concern:*

Be it known that I, STEPHEN B. GRAY, a resident of Jacksonville, in the county of Morgan and State of Illinois, have invented certain new and useful Improvements in Motor-Vehicles, of which the following is a full, clear, and exact description.

The present invention relates to motor-vehicles, and more particularly to the driving-mechanism whereby power is transmitted from the motor to the traction-wheels.

The present invention designs to provide improved and simple driving-mechanism for the wheels of a motor-vehicle.

In an application for patent filed by me in the United States Patent Office July 14, 1906, Serial No, 326,187, there is set forth driving-mechanism of this type. In another application filed Sept. 25, 1906, Serial No. 336,172, there is set forth a similar type of mechanism in which all of the wheels are positively driven and in which all of the wheels may be turned in one direction to steer the vehicle or the rear and front wheels may be turned in opposite directions respectively, to cause the vehicle to turn around a corner. In the mechanisms set forth in said applications, the speed of both the driving-mechanisms for the traction-wheels at sides of the vehicle respectively are varied relatively to the main drive-shaft, and the present invention provides a construction in which variation of the mechanism for driving the traction-wheels at one side only is necessary to effect differential driving of the traction-wheels at one side with respect to those at the other, to cause all of the traction-wheels to be driven at traction-maintaining speed.

The present invention also designs to provide simple and improved driving-mechanism for motor-vehicles in which all of the wheels are dirigible and positively driven.

Another object is to provide a driving-mechanism applicable to this type of vehicle and in which the relative speed of the traction wheels at one side only is varied to effect differential travel of the wheels at one side relative to those at the other, in propelling the vehicle around a turn when the wheels at the front and rear are turned in opposite directions respectively.

Another object is to provide an improved mechanism of this type whereby all the traction-wheels may be driven at the same relative speed so that the vehicle may be steered by turning all the wheels in the same direction.

The invention further designs to provide improved steering-mechanism for motor-vehicles, whereby all the wheels may be swung in the same direction or the wheels at the front and rear may be swung in opposite directions, respectively.

The invention consists in the several novel features hereinafter set forth and more particularly defined by claims at the conclusion hereof.

In the drawings: Fig. 5 is a detail of the device for controlling the variable speed-mechanism for causing the wheels at one side to be driven at different relative speed with respect to those at the other when the vehicle is being driven around a turn, the parts being shown in operative position. Fig. 5$^a$ is a similar view, the parts being shown in position to cause said variable speed-mechanism to drive the wheels at both sides at the same relative speed. Fig. 5$^b$ is a section on line 5$^b$—5$^b$ of Fig. 5$^a$. Fig. 7$^a$ is a similar view showing the parts in position to cause all of the wheels to be swung in the same direction. Fig. 7$^b$ is a section on line 7$^b$—7$^b$ of Fig. 7$^a$. Fig. 7$^c$ is a section on line 7$^c$—7$^c$ of Fig. 7. Fig. 9$^a$ is a vertical section through one of the dirigible wheel-mounts.

The improved mechanism is illustrated as applied to a motor-truck comprising a body or frame A of any suitable construction, being supported by the front traction-wheels B, B' and rear traction-wheels C and C'. The usual springs D are interposed between the frame and the front axle E, and rear axle F, respectively, as well understood in the art. The driving-mechanism of the vehicle is supported by a series of inverted arch bars $a$, $a'$, $a^2$, $a^3$, which are secured to the body or frame A and longitudinal truss-bars $a^4$ connected to the body A by struts $a^6$, are employed to brace the said body.

Each of the front and rear traction-wheels is pivotally connected to one of the axles, so that each is dirigible. Associated with each pivotal wheel-mount is a driving-connection whereby the wheel will be driven, either when it is running straight or turned at an angle with respect to the vehicle-body.

Figure 9:
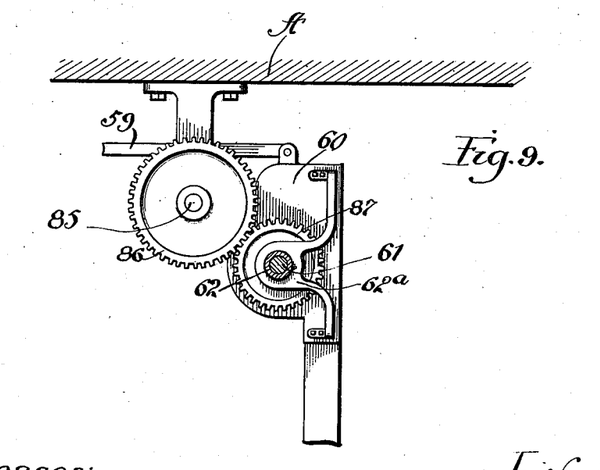
Fig. 9 is a section on line 9—9 of Fig. 1.
Figure 9A:
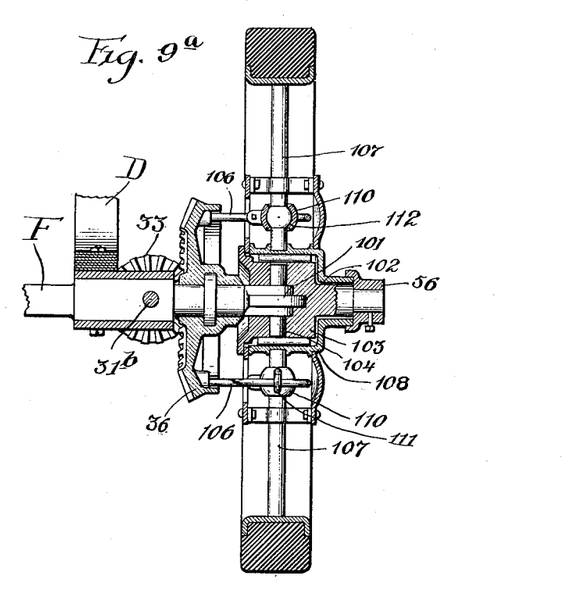

The specific construction of this wheel-mount forms no part of the present invention. In Fig. 9$^a$ is illustrated a form of mount which may be employed. The wheel-axle is extended outwardly and has an enlarged circular terminal 101 which is adapted to fit in a correspondingly shaped recess 102, formed in a wheel-spindle 103, and a pin 104 which is secured to the axle-terminal extends through a vertical hole in the spindle to connect the traction-wheel to the axle so the wheel may be swung laterally. The traction-wheel is suitably journaled on the spindle 104. Each traction-wheel is connected to be driven by a gear-wheel 36, journaled on the axle-terminal. Projecting laterally from gear-wheel 36 and secured thereto are stirrups 106 having their inner ends longitudinally secured to said gear so that they will rotate therewith. The traction-wheel comprises a series of spokes 107 secured at their inner ends in hub 108. A universal and flexible joint is provided between each stirrup and one of the spokes to maintain the traction-wheel in driving relation with respect to gear-wheel 36 at all times, while the traction-wheel is turned about its swivel-connection. These universal and flexible joints each comprise a bracket 110, formed of sections secured together and having lugs 111 through which the stirrups are extended to form a sliding connection for the brackets to permit the wheel to swing and maintain its driving relation with respect to gear wheel 36. Each bracket 110 is connected by a ball and socket joint 112 to one of the wheel-spokes, the ball being slidable on the spoke. This construction exemplifies a dirigible wheel-mount and driving-connection for the traction-wheel.

The improved driving-mechanism is of such construction that each of the wheels will be positively driven and embodies mechanism whereby the traction-wheels at one side of the vehicle may be driven at a differential speed with respect to the traction-wheels at the other side when the vehicle is traveling around a turn, so that each of the wheels will be driven at proper traction-maintaining speed, thus avoiding the use of the usual differential or slip gear-mechanism which permits one wheel to travel faster than the other but does not positively drive each of the wheels at such speed that traction of all of the wheels will be maintained at all times.

At times, it is desirable to turn all of the wheels in the same direction, to cause the vehicle to move bodily, laterally and longitudinally in lieu of the usual turning movement in which the rear and front wheels travel in substantially the same curvilinear path. When the former mode of steering is employed all of the wheels should be driven at substantially the same speed. To permit all of the traction-wheels to be turned in the same direction to greater or less degree and cause all of the wheels to be driven at the same speed, mechanism is provided which sets the driving-mechanism so that all the wheels will be driven at the same relative speed.

Power is transmitted from the motor (not shown) to a main drive-shaft 20 which is mounted in journals sustained by the frame-bars $a$, $a^2$ respectively. This main drive-shaft operates a shaft 21 of the mechanism for driving the traction-wheels B, C at one side of the vehicle, suitable clutches, high and low speed connections, and a reversing-gear being usually interposed between said shafts 20 and 21. Shaft 21 is mounted in journals 21$^a$ on frame-bars $a$, $a^3$. The high-speed connection comprises a gear 22 mounted on shaft 20 and controlled by a clutch 23, and a gear-wheel 24 slidably mounted on a shaft 21, and meshing with gear 22. The low-speed connection comprises a pinion 29 on shaft 20 and a gear-wheel 30 which is slidable with gear 24 of the high-speed connection, and mounted on shaft 21 so it may be brought into engagement with pinion 29 which is also controlled by clutch 23. The reversing-gear for propelling the vehicle in backward direction is controlled by a suitable clutch 25 and comprises a pinion 26, which is free to revolve on shaft 20 and connected to one of the members of clutch 25 an idler 27 and a gear-wheel 28 secured to shaft 21. It will be understood that suitable devices will be provided for operating the clutches and gears 24, 30, as desired. Thus it will be seen that the shaft 21 may be driven at different relative speeds with respect to the main drive-shaft or may be reversed.

The driving-connection for the traction-wheels B, C at one side of the vehicle, comprises a shaft 31 which is driven from shaft 21 by meshing gears 34, 35, and is operatively connected to drive traction-wheel B by a shaft-section 31ª and to drive traction-wheel C by a shaft-section 31ᵇ. Each of said sections is connected at one of its ends to said shaft by a universal joint 32 and has a pinion 33 suitably mounted on its other end. Each of the pinions 33 meshes with a gear 36 of one of the dirigible wheel-mounts to drive one of the traction-wheels.

The driving-connection for the traction-wheels B', C' at the other side of the vehicle is operated by a variable-speed driving-mechanism which is operated by shaft 21 which is always driven at a speed relative to the main drive-shaft 20. Said variable-speed mechanism causes the traction-wheels at one side to be driven at different speed with respect to those at the other, when necessary in turning a corner, and without disturbing or varying the relative speed of the driving-connection for the wheels at one side with respect to the main drive-shaft. In other words, it is only necessary, to effect differential relative driving of the wheels at each side respectively, to vary the relative speed of the driving-connection for the traction-wheels at one side.

The driving-connection for the traction-wheels B', C' comprises a shaft 37 journaled in bearings 37ª on frame-bars a', a³ respectively. Said shaft 37 is operatively connected to said traction-wheels in the same manner that shaft 21 is connected to wheels B, C, i. e. by gears 34, 35, a shaft 31, universal-joints 32, shaft-sections 31ª 31ᵇ, pinions 33, and gears 36, which are respectively connected to the traction-wheels B', C'.

Figures 1, 2:
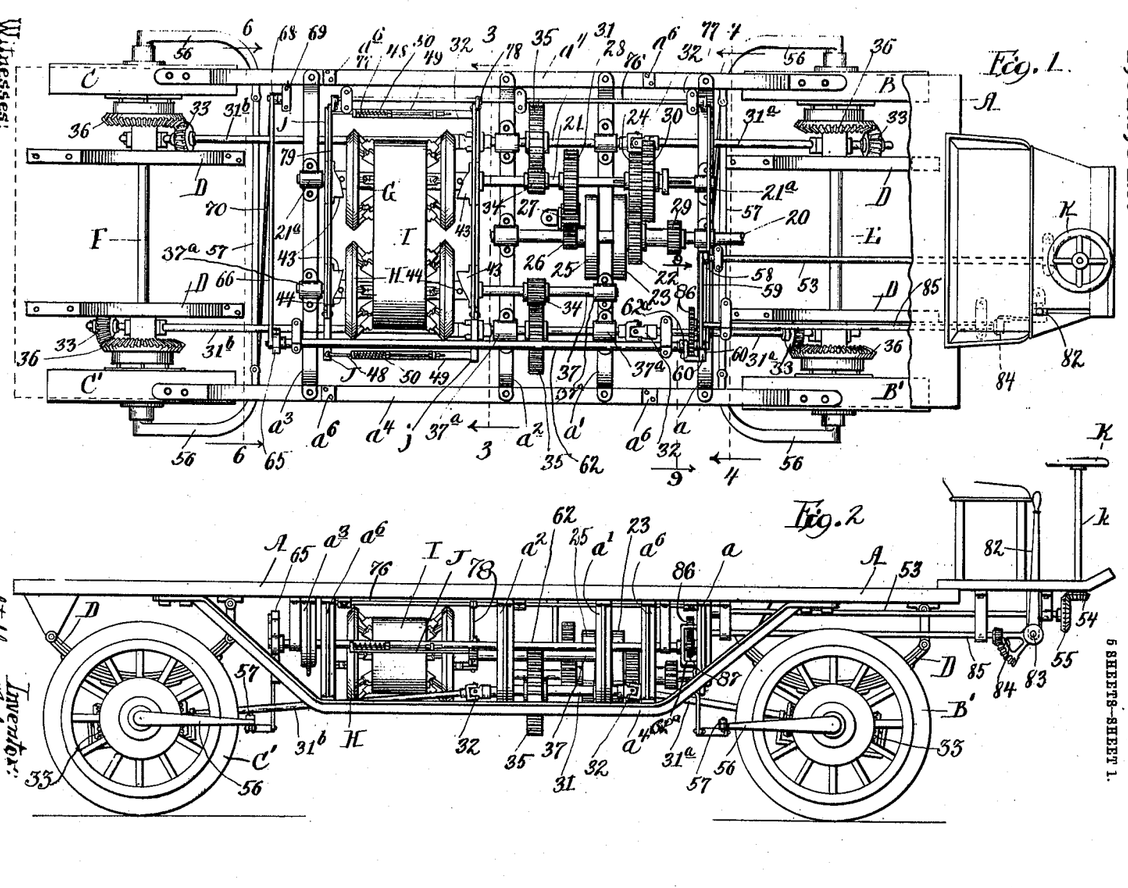
Figure 1 is a plan of a vehicle embodying the invention, a portion of the body being broken away to illustrate the parts beneath.
Fig. 2 is a side elevation.
Figure 8:
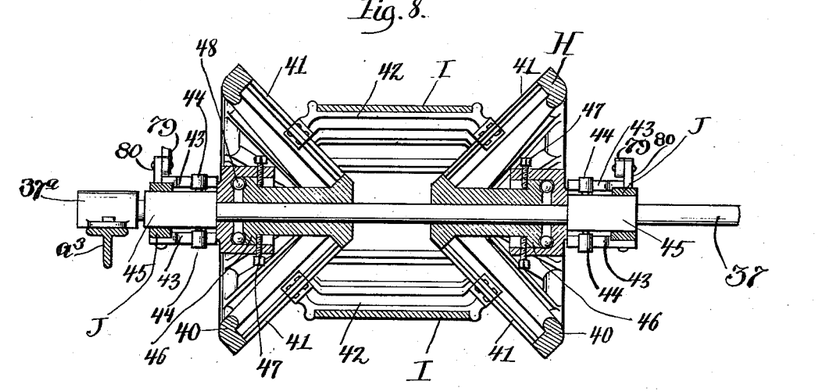
Fig. 8 is a vertical longitudinal section of one of the adjustable pulleys of the variable-speed driving-connection between the driving-mechanism for the traction-wheels at one side and the corresponding mechanism at the other.

In turning a corner in the more usual manner, the front wheels are turned in one direction and the rear wheels in opposite direction and in order to drive each of the wheels at traction-maintaining speed, the inner wheels traveling in a path of shorter radius, must be driven at a different speed with respect to the wheels at the outer side of the vehicle. To differentially drive the wheels at one side with respect to those at the other under such circumstances, and to cause all of them to be positively driven, an adjustable or variable driving-connection is interposed between the drive-shaft of the driving-connection for the wheels at one side and the shaft of the corresponding connection for the other. This adjustable mechanism comprises a pair of adjustable pulleys G and H respectively mounted on shafts 21 and 37 and connected together by an endless belt I. Each pulley (see Fig. 8) comprises a pair of oppositely disposed sides 40 each of which is slidably mounted on its shaft and provided with inclined rods or guides 41 to which are slidably connected, adjustable rim-sections 42. The guides 41 on the wheel-sides 40 respectively, are oppositely inclined so that when the wheel-sides are relatively adjusted longitudinally on the shaft the rim-sections which are slidably connected thereto, will be moved inwardly or outwardly to vary the size of the rim or periphery of the wheel. Each of the wheel-sides of the adjustable-pulleys is controlled by a pair of cams 43 each of which engages a stud 44 on a collar 45 which is non-rotatably held on the shaft and controls the axial movement of the wheel-sides, by means of a suitable connection comprising a hub-flange 46, screws 47 and balls 48 engaging said flange. The cams 43 for the several wheel-sides of the pulleys are conjointly adjustable, being secured to a frame J. This frame J is slidably mounted on collars 45 which are loose on the shafts of the pulleys and cams 43 are relatively formed to cause the rim of one pulley to be increased and the other to be correspondingly decreased so that the belt will be, at all times, maintained in operative relation with respect to the pulleys. To keep the belt taut despite any slight variation in its length or resulting from wear or from the different positions in which the pulleys may be set, the side-bars j of frame J are connected by yielding or spring-connections, (Fig. 1) each of which comprises a rod 48 secured to one of the side-bars and a bar 49 in which the rod is guided, a spring 50 being interposed between these parts so that the side-bars of the frame will be drawn together and the cams will be yieldingly pressed inwardly. This variable-speed connection between the driving-connection for the traction-wheels at one side and the driving-connection for the wheels at the other, is controlled by the steering-mechanism or conjointly controlled therewith so that while the connection at one side is always driven by the main-shaft 20 without variation, the relative speed of the wheels at the other side is either increased or decreased to cause the peripheral speed of all of the wheels to correspond to the ground over which the traction-wheels respectively travel in turning a corner.

Figure 4:
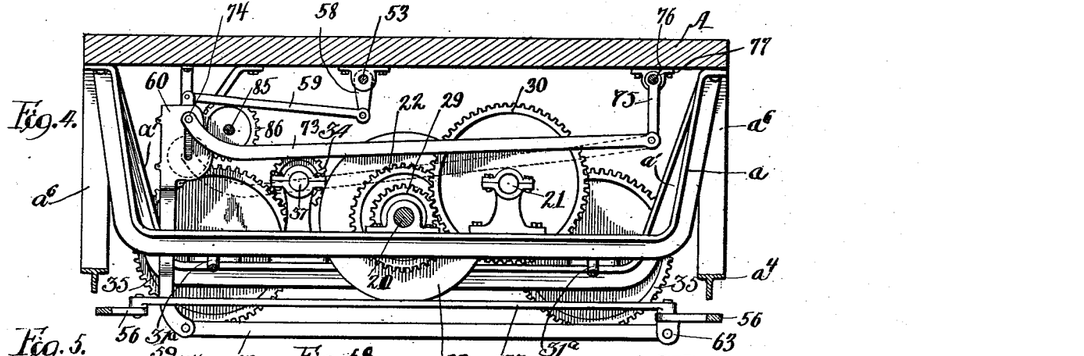
Fig. 4 is a section on line 4—4 of Fig. 1.

Steering-means is provided which is adapted to swing all of the traction-wheels about their pivotal connection with the frame. A steering-wheel or lever K is suitably mounted to operate a shaft k which operates a longitudinally extending shaft 53 by means of a pinion 54 and a gear-wheel 55 meshing therewith. The swinging or stub-axle of each traction-wheel has secured thereto an arm 56 whereby the wheel can be swung laterally in the desired direction. The arms of the front and rear wheels respectively are cross-connected by a link 57, so that they will be caused to swing in unison and equidistantly by the steering-mechanism. The operating-connection for steering the front wheels by the steering-shaft 53 and operating the cross-connector 57 for the front wheels, comprises an arm 58 secured to shaft 53, a link 59 (Fig. 4) connected to the upper end of a lever 60 which is pivotally sustained by a shaft 61 (Fig. 5) and secured to a longitudinal sleeve 62 on said shaft, by a bracket 62ª. The lower end of lever 60 is connected by a link 62 to the cross-connector for the front wheels, as at 63. When the steering-wheel is turned, the front wheels are operated by said connection and sleeve 62 is oscillated to operate the steering-connection for the rear wheels, which comprises (Figs. 6–7ª) a lever or frame 65 secured to the rear end of sleeve 62, and a link 66 which is pivotally connected to a stud 67 on a slide which is mounted in lever 65 and locked thereto. The other end of link 66 is pivotally connected to the upper end of a lever 68, which is pivotally sustained by a hanger 69 and has its lower end connected to the cross-connector 57 for the rear steering-wheels, by a link 70 which is pivotally connected to said lever as at 71 and to said cross-connection at 72.

The steering-mechanism, when the steering-connection is in one of its alternative positions, causes the front wheels to be swung conjointly and equidistantly in one direction and the rear wheels to be swung in the opposite direction when the vehicle is to make a turn in the more usual way. When that occurs, the inner wheels, traveling over an arc of shorter radius than the outer wheels, are driven at a slightly lower speed in order that they may be positively driven at traction-maintaining speed and according to the distance over which the wheels respectively travel. To effect this positive and differential travel, according to the angle at which the wheels are turned, the adjustable driving-connection (pulleys G, H and belt I) between the drive-shaft 21 for the traction-wheels at one side and the drive-shaft 37 for the traction-wheels at the other, is adjusted conjointly with the steering-connections for the traction-wheels.

Figure 3:
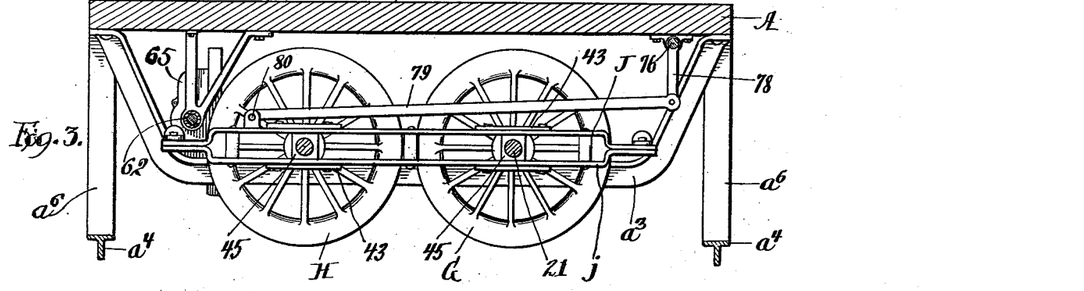
Fig. 3 is a section on line 3—3 of Fig. 1.

The connection for adjusting the frame J to adjust the pulleys G, H, for driving the traction-wheels B′, C′, comprises (Figs. 4, 5–5ᵇ) a link 73 which is pivotally connected at one end by a stud 74, to lever 60. Stud 74 is locked to lever 60 and at its other end, link 73 is pivoted to an arm 75 secured to a rock-shaft 76 which is mounted in bearings 77 secured to the frame A. Said rock-shaft (Fig. 3) is connected to each of the side-bars j of the cam carrying frame J, by an arm 78 and a link 79 which is pivoted to the bar at 80. When the traction-wheels are held to travel straight the steering-wheel operated connection, which controls the adjustment of pulleys G, H, holds the shifter-frame J with its cams 43 in position to drive the traction-wheels B′ and C′ at the same speed as the wheels B, C. When the steering-device is operated to cause the vehicle to turn to the right, the pulleys are adjusted so pulley H and the inner traction-wheels B′, C′ will be driven at a slightly lower speed than the traction-wheels B, C, and when the steering-device is reversely operated, so the traction-wheels B′, C′ will traverse the longer arc of the turn or be on the outer side, their speed will be correspondingly increased with respect to the traction-wheels B, C at the inner side of the turn. This variation of relative speed occurs when the stud 74 is locked in operative or eccentric position seen in Fig. 5. Resultantly, when the steering-mechanism is operated, the relative speed of the wheels at one side is correspondingly varied with respect to the speed of the wheels at the other side and according to the direction in which the vehicle is turned, to always cause all of the wheels to be positively driven at traction-maintaining speed.

Figure 7:
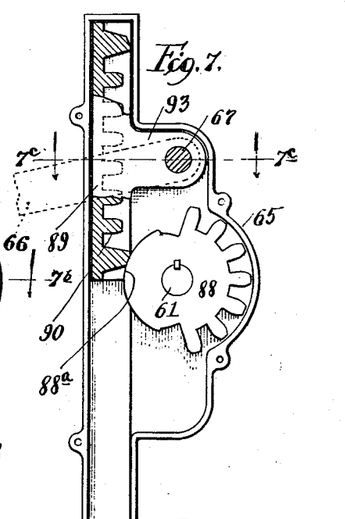
Fig. 7 is a detail view of the reversible device of the steering-connection whereby the front and rear traction-wheels may be swung in the same or opposite directions relatively, the parts being shown in position to cause the rear wheels to be swung in opposite direction with respect to the front wheels.
Figures 7A, 7B, 7C:
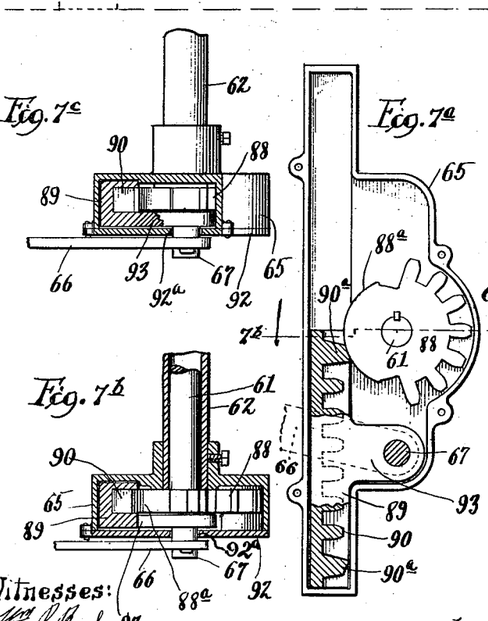

In practice it is sometimes desirable to turn all of the traction-wheels in the same direction to cause both the front and rear wheels to move laterally in the same direction, so as to cause the vehicle to sheer or move bodily to one side or the other. To permit this to be done, the steering-connections for the front and rear wheels are manipulated so that, in lieu of being operated in opposite directions relatively, they will be operated to turn all of the traction-wheels in the same direction. When this method of steering is used, all of the traction-wheels are positively driven at the same speed. A device is provided to manipulate one of the steering-connections, e. g., the rear, so that the movement thereof will be in reverse direction from that normally given to it by the steering-lever. This reversing device is controlled by a hand-lever 82 (Fig. 2) pivotally sustained at 83 and provided with a segmental rack for rotating a pinion 84, and a shaft 85 whereto the pinion is secured. To the rear end of said shaft a gear-wheel 86 (Fig. 9) is secured and this gear meshes with a pinion 87 secured to shaft 61 which extends through and is journaled in sleeve 62 which connects the front and rear steering-connections. To the rear end of shaft 61 is secured (Figs. 7–7ᶜ) a segmental rack or toothed wheel 88 which is adapted to shift a slide 89 which is mounted in lever 65 and which carries the reversible stud 67. Slide 89 has a series of teeth 90 adapted to be engaged by the teeth of wheel 88 to shift the slide and stud 67 to the opposite side of the lever-fulcrum or sleeve 62, so that the steering-connection (link 66, lever 68, link 57 and arms 56) will operate the rear traction-wheels in the same direction as, and correspondingly to, the front-wheels, when the parts are in position illustrated in Fig. 7ª. The end-teeth 90ª on slide 89 are formed to respectively engage a concentric-surface 88ª on wheel 88 when the slide is in one of its alternative operative positions to lock the slide and stud 67 against radial movement, but to permit the slide to swing with sleeve 62. Resultantly, the slide is locked in either of its operative positions without interfering with its reversibility or its oscillation in steering. A plate 92 is secured to the open face of the lever 65, and stud 67 which is secured to an offset lug 93 of slide 89, extends through a slot 92ª in said plate. The position of said parts when causing the front and rear wheels to be swung in opposite directions is illustrated in Fig. 7. As a result of this construction the reversing-device may be manipulated, at any time, no matter what the position of steering-wheel or connections me be, from either of its alternative positions to the other.

By means of lever 82 and the reversible connection, the steering-wheel may be used in the same manner to control the vehicle by swinging all the wheels in the same direction or by swinging the front and rear wheels in opposite directions respectively.

Figures 5, 5A, 5B:
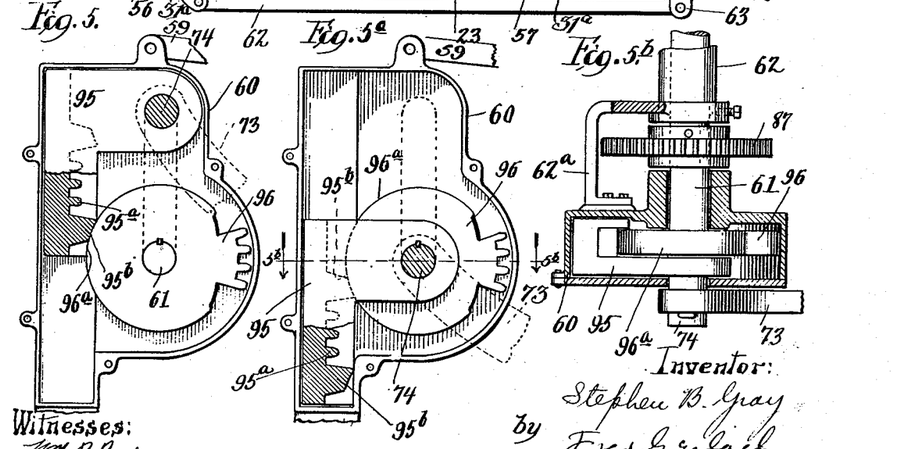
Figure 6:
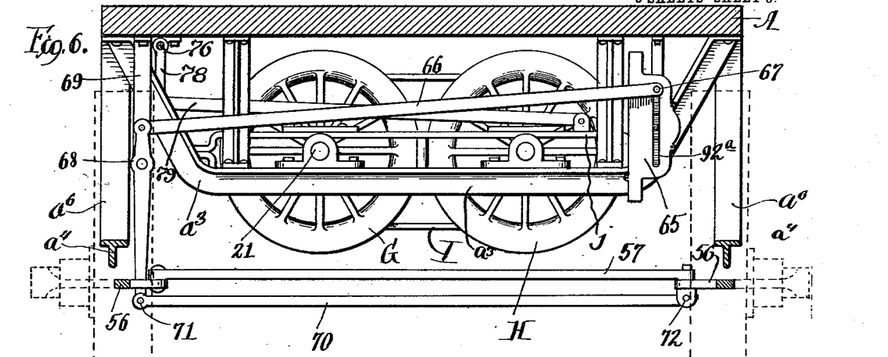
Fig. 6 is a section on line 6—6 of Fig. 1.

When the steering-device is operated to turn all of the wheels in the same direction the adjustable connection or mechanism between the driving-shaft 21, 37 for the wheels at the sides of the vehicle, respectively, should be adjusted in position to cause both of said shafts to be driven at substantially the same relative speed and be rendered inoperative by the steering-mechanism. For this purpose the stud 74 is slidably mounted in lever 60 (Figs. 5, 5ᵇ), which is operated by the steering-wheel and connected to the controlling-cams for the adjustable pulley G, H by said stud. When the adjustable mechanism is to be rendered inoperative, stud 74 is shifted into "dead-center" relation with respect to lever 60, so that when the latter is oscillated it will not adjust or vary the pulley-adjusting mechanism when the steering-lever is operated. The mechanism for rendering the pulley-adjusting mechanism inoperative by the steering-lever is controlled by shaft 61 which is operated by hand-lever 82, stud 74 is secured to a slide 95 which is provided with a series of rack-teeth 95ª and confined in a way formed in lever 60. A toothed wheel 96 secured to the front end of shaft 61 is adapted to shift the slide 95 from operative position (Fig. 5) to inoperative position (Fig. 5ª). The end-teeth 95ᵇ are adapted to engage a concentric surface 96ª of wheel 96 to lock the slide in either of its alternative positions, so it will be secured against radial movement, but may swing with lever 60. This construction makes it possible to render the pulley-adjusting connection inoperative and locked at all times or when the traction-wheels are in any of the positions, and does not at any time interfere with the operation of the steering-mechanism. Being operated by hand-lever 82, which manipulates the steering-connections to operate the traction-wheels for one mode of steering to the other, the pulleys are locked in position to drive the traction-wheels at one side at the same speed relative to those at the other when the steering is done by swinging all of the traction-wheels in the same direction, and the pulleys are adjusted to differentially drive the traction-wheels at one side, when steering is being done by swinging the front and rear wheels in opposite directions respectively.

The operation of the improved mechanism will be as follows: Shaft 20, being driven by the motor, will, by means of either of the gear-mechanisms and clutches, impart revolution to the drive-shaft 21 for the driving-connection for the traction-wheels B, C, at one side of the vehicle. Gear-wheels 34, 35 impart movement from shaft 21 to the shaft 31 and its connections for driving-wheels B, C. The drive-shaft 37 which drives shaft 31 of the driving-connection for the wheels B′, C′, at the other side of the vehicle, will be driven by adjustable pulleys G, H, and belt I. When the vehicle is traveling straight ahead, the driving-connections will be driven at the same relative speed. If now, the steering-wheel K is manipulated to cause the vehicle to turn in either direction, the front and rear wheels will be swung in opposite directions respectively by the steering-connections, and lever 60 will simultaneously operate (Figs. 3 and 4) link 73, arms 75, shaft 76, arms 78, links 79, frame J and cams 43 to adjust the pulleys G, H, so that the speed of one shaft 31 will be increased and the other decreased correspondingly and so that they will be adjusted to cause the wheels B′, C′, to travel at a greater or less speed according to the direction in and extent which the traction-wheels are turned. If the vehicle be turned toward the left, the wheels B′ and C′ will be driven at a higher speed than the wheels at the other side and if to the right, they will be driven at a lower speed, thus positively driving all of the traction-wheels at substantially traction-maintaining speed at all times. When it is desired to steer the vehicle, by turning all of the traction-wheels in the same direction, lever 82 will be shifted to operate segment 84, shaft 85 (Fig. 2), gears 86, 87, shaft 61, and toothed wheel 88, to shift or reverse stud 67 of the steering-connection for the rear traction-wheels, so they will be turned, under control of the steering-wheel K, in the same direction as the front wheels. Simultaneously, shaft 61 will operate toothed wheel 96 to operate slide 95 to shift stud 74 into dead-center relation with respect to lever 60 so that manipulation of the latter by the steering-wheel K will not affect the adjustable speed-mechanism between shafts 21, 37 and so said mechanism will be locked in position to cause all the traction-wheels to be driven at the same speed. If said adjusting mechanism is not in normal position, the operation of lever 82 will cause it to be adjusted into such position. Reverse shift of lever 82 will cause stud 67 for the rear steering-connection, and stud 74 for the pulley-adjusting connection to be set and locked in proper position for operation of the front and rear traction-wheels in opposite directions by steering-wheel K and corresponding adjustment of pulley G, H.

One important feature of the present invention is that the driving-connection for the wheels at one side is operated relatively from the motor shaft and without relative variation with respect thereto in steering and that the driving mechanism for the wheels at the other side of the vehicle is operated from the first mentioned mechanism. This arrangement makes it possible to employ a simpler construction than heretofore, particularly in structures embodying the improvements set forth in my earlier applications and also relieves the adjustable connection of the strains of driving both of the mechanisms for the wheels at each side respectively. Another important feature, is that the steering-wheel without variation of its operation, controls the traction-wheels in either mode of steering.

The invention is not to be understood as restricted to the details illustrated and described since these may be modified by the skilled mechanic without departing from the spirit and scope of the invention.

Having thus described the invention, what I claim as new and desire to secure by Letters Patent, is:

1. In a motor-vehicle, the combination with a pair of front and a pair of rear traction wheels, each wheel being dirigibly connected to the vehicle, of a main drive-shaft, driving-mechanism for both wheels at one side of the vehicle, driving-mechanism for both wheels at the other side of the vehicle, a driving-connection intermediate the main shaft and the mechanism for driving the wheels at one side, and a variable speed driving connection between the driving-mechanisms for the wheels at each side respectively for driving the other of said mechanisms and whereby the speed of the wheels at one side may be varied without varying the speed of the wheels at the other.

2. In a motor-vehicle, the combination with a pair of front and a pair of rear traction-wheels, each wheel being dirigibly connected to the vehicle, of a main drive shaft, driving-mechanism for both wheels at one side of the vehicle, driving-mechanism for both wheels at the other side of the vehicle, a driving-connection intermediate the main shaft and the mechanism for driving the wheels at one side, and a variable-speed driving-connection between the driving-mechanisms for the wheels at each side respectively for driving the other of said mechanisms, and whereby said mechanisms may be driven at different relative speeds without varying said intermediate driving-connection.

3. In a motor-vehicle, the combination with a pair of front and a pair of rear traction-wheels, each wheel being dirigibly connected to the vehicle, of a main drive-shaft, driving-mechanism for both wheels at one side of the vehicle, driving-mechanism for both wheels at the other side of the vehicle, a driving-connection intermediate the main shaft and the mechanism for driving the wheels at one side, a variable speed driving-connection between the driving-mechanisms for the wheels at each side respectively for driving the other of said mechanisms and whereby the speed of the wheels at one side may be varied without varying the speed of the wheels at the other, and steering-means for all of said wheels connected to operate said variable speed connection.

4. In a motor-vehicle, the combination with a pair of front and a pair of rear traction-wheels, each wheel being dirigibly connected to the vehicle, of a main drive-shaft, driving-mechanism for both wheels at one side of the vehicle, driving-mechanism for both wheels at the other side of the vehicle, a driving-connection intermediate the main shaft and the mechanism for driving the wheels at one side, a variable speed driving-connection between the driving-mechanisms for the wheels at each side respectively, for driving the other of said mechanisms and whereby said mechanisms may be driven at different relative speeds without varying said intermediate driving-connection, and steering-means for all of said wheels connected to adjust said variable speed connection.

5. In a motor-vehicle, the combination with a pair of front and a pair of rear traction-wheels, each wheel being dirigibly connected to the vehicle, of a main drive-shaft, a drive-shaft for both wheels at one side of the vehicle, a drive-shaft for the wheels at the other, a driving-connection intermediate one of said shafts and the main shaft, and a variable-speed driving-connection between said drive-shafts for transmitting power from the drive-shaft which is driven by said intermediate connection to the other whereby the speed of the wheels at one side and which are driven by said other shaft may be varied without varying the speed of the wheels at the other side.

6. In a motor-vehicle, the combination with a pair of front and a pair of rear traction-wheels, each wheel being dirigibly connected to the vehicle, of a main drive-shaft, a drive-shaft for both wheels at one side of the vehicle, a drive-shaft for the wheels at the other, a driving-connection intermediate one of said shafts and the main shaft and a variable-speed driving-connection between said drive-shafts for transmitting power from the drive-shaft which is driven by said intermediate connection to the other, and whereby said drive-shafts may be driven at different relative speeds without varying said intermediate driving-connection.

7. In a motor-vehicle, the combination with a pair of front and a pair of rear traction-wheels, each wheel being dirigibly connected to the vehicle, of a main drive shaft, a drive-shaft for both wheels at one side of the vehicle, a drive-shaft for the wheels at the other, a driving-connection intermediate one of said drive-shafts and the main shaft, a variable-speed driving connection between said drive-shafts for transmitting power from the drive-shaft which is driven by said intermediate connection to the other and whereby the speed of the wheels at one side and driven by said other shaft may be varied without varying the speed of the wheels at the other side, and steering-means for all of said wheels connected to operate said variable speed connection.

8. In a motor-vehicle, the combination with a pair of front and a pair of rear traction-wheels, each wheel being dirigibly connected to the vehicle, of a main drive-shaft, a drive-shaft for both wheels at one side of the vehicle, a drive-shaft for the wheels at the other, a driving-connection intermediate one of said shafts and the main shaft, a variable-speed driving connection between said drive-shafts for transmitting power from the drive-shaft which is driven by said intermediate connection, to the other, and whereby said drive-shafts may be driven at different relative speeds without varying said intermediate driving-connection, and stering-means for all of said wheels connected to operate said variable speed-connection.

9. In a motor-vehicle, the combination with a pair of front and a pair of rear traction-wheels, each wheel being dirigibly connected to the vehicle, of a main-drive shaft, driving-mechanism for both wheels at one side of the vehicle, driving-mechanism for both wheels at the other side, a driving-connection intermediate the main shaft and the mechanism for driving the wheels at one side, a variable-speed driving-connection between the driving-mechanisms for the wheels at each side respectively for driving the other of said mechanisms and whereby the speed of the wheels at one side may be varied without varying the speed of the wheels at the other, and steering-mechanism connected to adjust said variable-speed connection and comprising means for shifting the front and rear wheels in opposite directions respectively and for shifting all the wheels in the same direction.

10. In a motor-vehicle, the combination with a pair of front and a pair of rear traction wheels, each wheel being dirigibly connected to the vehicle, of a main drive-shaft, driving-mechanism for both wheels at one side of the vehicle, driving-mechanism for both wheels at the other side, a driving-connection intermediate the main shaft and the mechanism for driving the wheels at one side, a variable-speed driving-connection between the driving-mechanisms for the wheels at each side respectively for driving the other of said mechanisms, and whereby said mechanisms may be driven at different relative speeds without varying said intermediate driving connection and steering-mechanism connected to adjust said variable-speed connection and comprising means for shifting the front and rear wheels in opposite directions respectively and for shifting all the wheels in the same direction.

11. In a motor-vehicle, the combination with a pair of front and a pair of rear traction-wheels each wheel being dirigibly connected to the vehicle, of a main drive-shaft, a drive-shaft for both wheels at one side of the vehicle, a drive-shaft for the wheels at the other, a driving-connection intermediate one of said shafts and the main-shaft, a variable speed driving-connection between said drive-shafts for transmitting power from the drive-shaft which is driven by said intermediate connection to the other and whereby the speed of the wheels at one side and driven by said other shaft may be varied without varying the speed of the wheels at the other side, and steering-mechanism connected to adjust said variable speed connection, and comprising means for shifting the front and rear wheels in opposite directions respectively and for shifting all the wheels in the same direction.

12. In a motor-vehicle, the combination with a pair of front and a pair of rear traction-wheels each wheel being dirigibly connected to the vehicle, of a main drive-shaft, a drive-shaft for both wheels at one side of the vehicle, a drive-shaft for the wheels at the other, a driving-connection intermediate one of said shafts and the main shaft, a variable speed driving-connection between said drive-shafts for transmitting power from the drive-shaft which is driven by said intermediate connection to the other and whereby said drive-shafts may be driven at different relative speeds without varying said intermediate driving-connection, and steering-mechanism connected to adjust said variable-speed connection, and comprising means for shifting the front and rear wheels in opposite directions respectively and for shifting all the wheels in the same direction.

13. In a motor-vehicle, the combination with a pair of front and a pair of rear traction-wheels each wheel being dirigibly connected to the vehicle, of a main-drive-shaft, driving-mechanism for both wheels at one side of the vehicle, driving-mechanism for the wheels at the other side, gear-mechanism intermediate said main drive-shaft and one of said mechanisms, and a variable-speed mechanism between said driving-mechanisms for driving the other of said mechanisms to drive the wheels at one side at different speed with respect to the wheels at the other.

14. In a motor-vehicle, the combination with a pair of front and a pair of rear traction-wheels each wheel being dirigibly connected to the vehicle, of a main drive shaft, driving-mechanism for both wheels at one side of the vehicle, driving-mechanism for the wheels at the other side, gear-mechanism intermediate said main drive-shaft and one of said mechanisms, a variable-speed mechanism between said driving-mechanisms for driving the other of said mechanisms to drive the wheels at one side at different speeds with respect to the wheels at the other, and steering-mechanism for all of said wheels connected to adjust said variable speed mechanism.

15. In a motor-vehicle, the combination with a pair of rear and a pair of front traction-wheels, each wheel being dirigibly connected to the vehicle, of a main-shaft, a drive-shaft for the wheels at one side of the vehicle, a drive-shaft for the wheels at the other side, gear-mechanism between the main-shaft and one of said drive-shafts, and a variable-speed mechanism between said drive-shafts for driving the other of said drive-shafts to drive the wheels at one side at different speeds with respect to the wheels at the other and whereby one of said drive-shafts will be constantly driven from the main-shaft and the other may be differentially driven.

16. In a motor-vehicle, the combination with a pair of rear and a pair of front traction-wheels each wheel being dirigibly connected to the vehicle, of a main-shaft, a drive-shaft for the wheels at one side of the vehicle, a drive-shaft for the wheels at the other side, gear-mechanism between the main shaft and one of said drive-shafts, a variable-speed mechanism between said drive-shafts for driving the other of said drive-shafts to drive the wheels at one side at different speed with respect to the wheels at the other and whereby one of said drive-shafts will be constantly driven from the main-shaft and the other may be differentially driven and steering-means for all of said wheels connected to adjust said variable speed mechanism.

17. In a motor-vehicle, the combination with a pair of front and a pair of rear traction-wheels, each wheel being dirigibly connected to the vehicle, of a main-drive shaft, driving-mechanism for both wheels at one side of the vehicle, driving-mechanism for the wheels at the other side, gear-mechanism intermediate said main drive-shaft and one of said mechanisms, a variable-speed mechanism between said driving-mechanisms for driving the other of said mechanisms to drive the wheels at one side at different speeds with respect to the wheels at the other, and steering-mechanism connected to adjust said variable-speed mechanism and comprising means for shifting the front and rear wheels in opposite directions respectively and for shifting all of the wheels in the same direction.

18. In a motor-vehicle, the combination with a pair of rear and a pair of front traction-wheels, each wheel being dirigibly connected to the vehicle, of a main-shaft, a drive-shaft for the wheels at one side of the vehicle, a drive-shaft for the wheels at the other side, gear-mechanism between the main-shaft and one of said drive-shafts, a variable-speed mechanism between said drive-shafts for driving the other of said drive-shafts to drive the wheels at one side at different speeds with respect to the wheels at the other and whereby one of said drive-shafts will be constantly driven from the main-shaft and the other may be differentially driven, and steering-mechanism connected to adjust said variable-speed mechanism and comprising means for shifting the front and rear wheels in opposite directions respectively and for shifting all of the wheels in the same direction.

19. In a motor-vehicle, the combination with a pair of front and a pair of rear traction-wheels, each wheel being dirigibly connected to the vehicle, of a main-drive-shaft, a driving-mechanism for both wheels at one side of the vehicle a driving-mechanism for the wheels at the other side, gear-mechanism between the main-shaft and one of said driving-mechanisms, and a variable-speed driving-mechanism between said driving-mechanisms for differentially driving the other without varying the speed of the one driven by said gear-mechanism, to drive both of the traction-wheels at one side at different speed with respect to those at the other, said variable speed-mechanism comprising a pair of adjustable pulleys, and connecting-means.

20. In a motor-vehicle, the combination with a pair of front and a pair of rear traction-wheels, each wheel being dirigibly connected to the vehicle, of a main-drive-shaft, a driving-mechanism for both wheels at one side of the vehicle, a driving-mechanism for the wheels at the other side, gear-mechanism between the main-shaft and one of said driving-mechanisms, a variable-speed-driving-mechanism between said driving-mechanisms for differentially driving the other without varying the speed of the one driven by said gear-mechanism to drive both of the traction-wheels at one side at different speed with respect to those at the other, said variable speed-mechanism comprising a pair of adjustable pulleys, and a belt.

21. In a motor-vehicle, the combination with a pair of front and a pair of rear traction-wheels, each wheel being dirigibly connected to the vehicle, of a main drive-shaft, driving-mechanism for both wheels at one side of the vehicle, driving-mechanism for the wheels at the other side, gear-mechanism between the main-shaft and one of said driving-mechanisms, a variable-speed driving-mechanism between said driving-mechanisms for differentially driving the other without varying the speed of the one driven by said gear-mechanism to drive both of the traction-wheels at one side at different speed with respect to those at the other, said variable speed-mechanism comprising a pair of adjustable pulleys, connecting-means, and steering-means for all of said wheels connected to adjust said variable-speed mechanism.

22. In a motor-vehicle, the combination with a pair of front and a pair of rear traction-wheels, each wheel being dirigibly connected to the vehicle, of a main drive-shaft, a driving-mechanism for both wheels at one side of the vehicle, a driving-mechanism for the wheels at the other side, gear-mechanism between the main-shaft and one of said driving-mechanisms, a variable-speed driving mechanism between said driving-mechanisms for differentially driving the other without varying the speed of the one driven by said gear-mechanism to drive both of the traction-wheels at one side at different speed with respect to those at the other, said variable speed-mechanism comprising a pair of adjustable pulleys, a belt, and steering-means for all of said wheels connected to adjust said variable speed-mechanism.

23. In a motor-vehicle, the combination with a pair of front and a pair of rear traction-wheels, each wheel being dirigibly connected to the vehicle, of a main drive-shaft, a driving-mechanism for both wheels at one side of the vehicle, a driving-mechanism for the wheels at the other side, gear-mechanism between the main-shaft and one of said driving-mechanisms, a variable-speed driving-mechanism between said driving-mechanisms for differentially driving the other without varying the speed of the one driven by said gear-mechanism to drive both of the traction-wheels at one side at different speed with respect to those at the other, said variable speed-mechanism comprising a pair of adjustable pulleys, connecting-means, and steering-mechanism connected to adjust said variable-speed mechanism and comprising means for shifting the front and rear wheels in opposite directions respectively and for shifting all the wheels in the same direction.

24. In a motor-vehicle, the combination with a pair of front and a pair of rear traction-wheels, each wheel being dirigibly connected to the vehicle, of a main drive-shaft, a driving-mechanism for both wheels at one side of the vehicle, a driving-mechanism for the wheels at the other side, gear-mechanism between the main-shaft and one of said driving-mechanisms, a variable-speed driving mechanism between said driving-mechanisms for differentially driving the other without varying the speed of the one driven by said gear-mechanism to drive both of the traction-wheels at one side at different speed with respect to those at the other, said variable speed mechanism comprising a pair of adjustable pulleys, a belt, and steering-mechanism connected to adjust said variable-speed mechanism, and comprising means for shifting the front and rear wheels in opposite directions respectively and for shifting all the wheels in the same direction.

25. In a motor-vehicle, the combination of a pair of front and a pair of rear dirigible wheels, driving-mechanism for all of said wheels, steering-connections for all four of said wheels, a steering-device whereby said connections may be operated, means for varying said connections so that said device by like operation may swing all of the wheels in the same direction or swing the front pair and rear pair in opposite directions respectively, and means for varying the relative speed of the wheels at one side with respect to those at the other.

26. In a motor-vehicle, the combination of a pair of front and a pair of rear dirigible wheels, driving-mechanism for all of said wheels, steering-connections for all four of said wheels, a steering-device whereby said connections may be operated, means for varying said connections so that said device by like operation may swing all of the wheels in the same direction or swing the front pair and rear pair in opposite directions respectively, and means controlled by the steering-device for varying the relative speed of the wheels at one side with respect to those at the other.

27. In a motor-vehicle, the combination of a pair of front and a pair of rear dirigible wheels, steering-connections for said wheels comprising an eccentric-connection for operating one pair of said wheels, means for shifting said eccentric connection to swing said latter pair of wheels reversely comprising a wheel whereby the eccentric-connection will be held against radial movement but free to swing, and controlling-means for the steering-connections.

28. In a motor-vehicle, the combination of a pair of front and a pair of rear dirigible wheels, mechanism for driving all of said wheels, means for varying the relative speed of the wheels at one side with respect to those at the other, steering-connections for all of said wheels, means for reversing the operation of one of the steering-connections, and controlling-means for said steering-connections, connected to said speed-varying means.

29. In a motor-vehicle, the combination of a pair of front and a pair of rear dirigible wheels, mechanism for driving all of said wheels, means for varying the relative speed of the wheels at one side with respect to those at the other, steering-connections for all of said wheels, means for reversing the operation of one of the steering-connections, controlling-means for said steering-connections connected to said speed-varying means, and means for rendering the said varying-means inoperative by the controlling-means when said reversing-means is operated.

30. In a motor-vehicle, the combination of a pair of front and a pair of rear dirigible wheels, mechanism for driving all of said wheels, means for varying the relative speed of the wheels at one side with respect to those at the other, steering-connections for all of said wheels, means for reversing the operation of one of the steering-connections, controlling-means for said steering-connections connected to said speed-varying means, and means for rendering said varying-means inoperative by the controlling-means and locking the varying-means when said reversing-means is operated.

31. In a motor-vehicle, the combination of a pair of front and a pair of rear dirigible wheels, mechanism for driving all of said wheels, means for varying the relative speed of the wheels at one side with respect to those at the other, steering-connections for all of said wheels, a lever for reversing the operation of one of the steering-connections, and controlling-means for said steering-connections connected to said speed-varying means.

32. In a motor-vehicle, the combination of a pair of front and a pair of rear dirigible wheels, mechanism for driving all of said wheels, means for varying the relative speed of the wheels at one side with respect to those at the other, steering-connections for all of said wheels, means for reversing the operation of one of the steering-connections, controlling-means for said steering-connections connected to said speed-varying means, and means for rendering said varying-means inoperative by the controlling-means and for shifting the varying-means to cause all the wheels to be driven at the same speed when said reversing-means is operated.

33. In a motor-vehicle, the combination of a pair of front and a pair of rear dirigible wheels, driving-mechanism for all of said wheels, means for varying the speed of the wheels at one side with respect to those at the other, steering-connections for all of said wheels, controlling-means for said steering-connections connected to operate said varying-means, and means for rendering the varying-means inoperative by the controlling-means.

34. In a motor-vehicle, the combination of a pair of front and a pair of rear dirigible wheels, driving-mechanism for all of said wheels, means for varying the speed of the wheels at one side with respect to those at the other, steering-connections for all of said wheels, controlling-means for said steering-connections connected to operate said varying-means by an eccentric connection, and means for shifting said eccentric connection into dead-center relation so it will be inoperative by the controlling-means.

35. In a motor-vehicle, the combination of a pair of front and a pair of rear dirigible wheels, driving-mechanism for all of said wheels, means for varying the speed of the wheels at one side with respect to those at the other, steering-connections for all of said wheels, controlling-means for said steering-connections connected to operate said varying-means by an eccentric connection, and means for shifting said eccentric connection into dead-center relation so it will be inoperative by the controlling-means and for locking it in inoperative position.

36. In a motor-vehicle, the combination of a pair of front and a pair of rear dirigible traction-wheels, driving-mechanism for all of the wheels, and means for varying the speed of the driving-mechanism for both of the wheels at one side with respect to those at the other without changing the speed of the driving-mechanism for the wheels at said other side.

37. In a motor-vehicle, the combination of traction-wheels, driving mechanism for the wheels and means for controlling the speed of the driving mechanism comprising a lever, a link, a pivotal and sliding connection between the lever and the link, and means for sliding the connection to and from the lever-fulcrum.

38. In a motor-vehicle, the combination of a pair of front and a pair of rear dirigible traction-wheels, driving-mechanism for all of the wheels, means for varying the speed of the driving-mechanism for both of the wheels at one side with respect to those at the other without changing the speed of the driving-mechanism for the wheels at said other side, and steering-mechanism connected to operate said varying-means.

39. In a motor-vehicle, the combination of a pair of front and a pair of rear dirigible traction-wheels, driving-mechanism for all of the wheels, means for varying the speed of the driving-mechanism for both of the wheels at one side with respect to those at the other without changing the speed of the driving-mechanism for the wheels at said other side, steering-mechanism connected to operate said varying-means, and means for rendering the varying-means inoperative by the steering-mechanism.

40. In a motor-vehicle, the combination of a pair of front and a pair of rear dirigible traction-wheels, driving-mechanism for all of the wheels, means for varying the speed of the driving-mechanism for both of the wheels at one side with respect to those at the other without changing the speed of the driving-mechanism for the wheels at said other side, steering-mechanism connected to operate said varying-means, and means for rendering the varying-means inoperative by the steering-mechanism and for shifting the varying-means into position to cause all the wheels to be driven at the same speed when it is rendered inoperative by the steering-mechanism.

41. In a motor-vehicle, the combination of a pair of front and a pair of rear dirigible traction-wheels, driving-mechanism for all of said wheels comprising a shaft for driving the wheels at one side and a shaft for driving the wheels at the other, and means for varying the speed of one of said shafts without varying the other.

42. In a motor-vehicle, the combination of a pair of front and a pair of rear dirigible traction-wheels, driving mechanism for all of said wheels comprising a shaft for driving the wheels at one side and a shaft for driving the wheels at the other, means for varying the speed of one of said shafts without varying the other, and steering-mechanism for all of said wheels connected to operate said varying-means.

43. In a motor-vehicle, the combination of a pair of front and a pair of rear dirigible traction-wheels, driving-mechanism for all of said wheels comprising a shaft for driving the wheels at one side and a shaft for driving the wheels at the other, means for varying the speed of one of said shafts without varying the other, steering-mechanism for all of said wheels connected to operate said varying-means, and means for rendering the varying-mechanism inoperative by the steering-mechanism.

STEPHEN B. GRAY.

Witnesses:
FRED GERLACH,
LEONE E. RUSSELL.